(12) United States Patent
Lehenmeier et al.

(10) Patent No.: US 11,970,594 B2
(45) Date of Patent: Apr. 30, 2024

(54) ENHANCEMENT OF LONG-TERM PROPERTIES OF CLOSED-CELL RIGID POLYURETHANE FOAMS

(71) Applicant: BASF SE, Ludwigshafen am Rhein (DE)

(72) Inventors: Maximilian Lehenmeier, Ludwigshafen (DE); Hendrik Wagner, Lemfoerde (DE); Rainer Klenz, Ludwigshafen (DE); Heike Hoelscher, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/753,891

(22) PCT Filed: Sep. 17, 2020

(86) PCT No.: PCT/EP2020/076000
§ 371 (c)(1),
(2) Date: Mar. 17, 2022

(87) PCT Pub. No.: WO2021/053081
PCT Pub. Date: Mar. 25, 2021

(65) Prior Publication Data
US 2023/0002582 A1    Jan. 5, 2023

(30) Foreign Application Priority Data
Sep. 19, 2019 (EP) .................................... 19198304

(51) Int. Cl.
*C08J 9/36* (2006.01)

(52) U.S. Cl.
CPC .......... *C08J 9/365* (2013.01); *C08J 2205/052* (2013.01); *C08J 2205/10* (2013.01); *C08J 2375/04* (2013.01); *C08J 2467/02* (2013.01)

(58) Field of Classification Search
CPC ......... B32B 5/18; B32B 15/046; B32B 15/08; B32B 27/065; B32B 27/08; B32B 27/10; B32B 27/36; B32B 2266/0278; B32B 2266/08; B32B 2270/00; B32B 2307/304; B32B 2419/00; B32B 2597/00; B32B 2605/00; C08J 9/365; C08J 2205/052; C08J 2205/10; C08J 2375/04; C08J 2467/02; C08L 67/02
See application file for complete search history.

(56) References Cited

U.S. PATENT DOCUMENTS

| | | |
|---|---|---|
| 5,118,174 A | 6/1992 | Benford et al. |
| 5,817,721 A | 10/1998 | Warzelhan et al. |
| 5,863,991 A | 1/1999 | Warzelhan et al. |
| 5,880,220 A | 3/1999 | Warzelhan et al. |
| 5,889,135 A | 3/1999 | Warzelhan et al. |
| 6,111,058 A | 8/2000 | Warzelhan et al. |
| 6,120,895 A | 9/2000 | Kowitz et al. |
| 6,303,677 B1 | 10/2001 | Warzelhan et al. |
| 6,353,084 B1 | 3/2002 | Warzelhan et al. |
| 6,414,108 B1 | 7/2002 | Warzelhan et al. |
| 2009/0113925 A1 | 5/2009 | Korkmaz |
| 2013/0014676 A1* | 1/2013 | Imbrecht ............... B32B 27/065 108/57.25 |
| 2014/0179812 A1* | 6/2014 | Jackson ............. C08G 18/4236 521/173 |
| 2016/0363251 A1 | 12/2016 | Homann et al. |
| 2020/0326027 A1 | 10/2020 | Goto |

FOREIGN PATENT DOCUMENTS

| | | |
|---|---|---|
| DE | 102007011138 B4 | 11/2016 |
| DE | 102009027074 B4 | 1/2017 |
| EP | 3437861 | 2/2019 |
| WO | WO-92/09654 A2 | 6/1992 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/21689 A2 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25446 A1 | 8/1996 |
| WO | WO-96/25448 A1 | 8/1996 |
| WO | WO-98/12242 A1 | 3/1998 |
| WO | WO-2011/134856 A1 | 11/2011 |

(Continued)

OTHER PUBLICATIONS

International Search Report dated Jan. 21, 2021 in PCT/EP2020/076000, 3 pages.
Written Opinion dated Jan. 21, 2021 in PCT/EP2020/076000, 5 pages.
International Preliminary Report on Patentability dated Mar. 31, 2022 in PCT/EP2020/076000, 7 pages.

(Continued)

*Primary Examiner* — John M Cooney
(74) *Attorney, Agent, or Firm* — Grüneberg and Myers PLLC

(57) ABSTRACT

Polybutylene terephthalate can be used as a gas diffusion barrier for closed-cell rigid polyurethane foams. A thermal insulation element containing a closed-cell, rigid polyurethane foam, which is at least partially covered by a layer system containing at least one layer formed by a polybutylene terephthalate composition, is useful. Articles and devices may contain a corresponding thermal insulation structure, such as refrigerators, insulation panels, pipe insulations, water heaters, and thermally insulated transport boxes.

17 Claims, 1 Drawing Sheet

(56) References Cited

FOREIGN PATENT DOCUMENTS

| WO | WO-2011/134866 A2 | 11/2011 |
| WO | WO-2017/170332 A1 | 10/2017 |
| WO | 2019/007829 | 1/2019 |

OTHER PUBLICATIONS

European Search Report for EP Patent Application No. 19198304.8, dated Feb. 19, 2020, 3 pages.

* cited by examiner

ENHANCEMENT OF LONG-TERM PROPERTIES OF CLOSED-CELL RIGID POLYURETHANE FOAMS

CROSS-REFERENCE TO RELATED APPLICATIONS

This application is the National Stage entry under § 371 of International Application No. PCT/EP2020/076000, filed on Sep. 17, 2020, and which claims the benefit of priority to European Application No. 19198304.8, filed on Sep. 19, 2019. The content of each of these applications is hereby incorporated by reference in its entirety.

BACKGROUND OF THE INVENTION

Field of the Invention

The present invention relates to the use of polybutylene terephthalate as gas diffusion barrier for closed-cell rigid polyurethane foams, to a thermal insulation element comprising a closed-cell rigid polyurethane foam which is at least partially covered by a polybutylene terephthalate layer and to articles and devices comprising said thermal insulation structure like refrigerators, insulation panels, pipe insulations, water heater and thermally insulated transport boxes.

DESCRIPTION OF RELATED ART

Closed-cell rigid polyurethane foams (PU foams) are usually prepared by adding chemical and/or physical blowing agents to a reaction mixture composed of a polyol component and an isocyanate component. The blowing agents or the gaseous reaction products are entrapped in the closed cells of the PU foam. They are chosen such that they have a lower thermal conductivity than the main components of air. E.g. in a closed-cell rigid PU foam prepared with water as chemical and cyclopentane as physical blowing agent the main components present in the closed cells are $CO_2$ and cyclopentane. These compounds have lower thermal conductivities than nitrogen and oxygen and their presence in the closed cells improves the heat insulation properties of the PU foam. Unfortunately, these insulation gases and in particular $CO_2$ tend to diffuse out of the PU foam as well as oxygen and nitrogen from the surrounding air tend to diffuse into the PU foam, the exchange of the gases results in an increasing thermal conductivity of the PU foam.

Another problem arises from the possible chemical degradation of the plastic materials like HIPS (high impact modified polystyrene) used for the manufacture of certain parts of the insulated applications like the interior lining of refrigerators, if compounds like hydrofluorochlorocarbons, hydrofluorocarbons or hydrocarbons are used as blowing agents in the foaming process and diffuse out of the insulating foam into the plastic material. Especially the diffusion of certain hydrofluorochlorocarbons into the plastic inner liner lead to embrittlement and crack formation.

Furthermore, in case the insulating foam is sensitive to water, the diffusion of water into the insulating foam may also deteriorate the insulating capacities of the foam.

These aging effects are already known, and several measures are described in the prior art to reduce these effects e.g. for refrigerators and insulated pipes.

U.S. Pat. No. 5,118,174 relates to a liner construction for a refrigeration apparatus cabinet comprising an outer wall usually made of metal, an inner liner of the cabinet which is usually made of plastics like HIPS or ABS (acrylonitrile butadiene styrene copolymer), an insulating foam and a laminate provided between the insulating foam and the inner plastic liner. The laminate contains a barrier film layer for preventing hydrochlorofluorocarbon blowing agents contained within the insulating foam from diffusing into the inner plastic liner. The diffusion layer may be made of different polymers like EVOH (ethylene vinyl alcohol copolymer), Saran (polyvinylidene chloride), Nylon (polyamide), and PET (polyethylene terephthalate).

DE 10 2007011138 B4 discloses a refrigerator comprising a thermal insulating foam at least one layer preventing the diffusion of gas or water from or into the insulating foam. The gas diffusion inhibiting layer can be made of EVOH, the water barrier can be made of polyethylene or polyamide.

DE 10 2009027074 B4 describes a refrigerator with an outer wall comprising a thermal insulating foam, a plastic carrier layer and a gas diffusion barrier layer located between the foam and the plastic layer for inhibiting the diffusion of vapor from the surrounding air into the foam and the diffusion of gases out of the foam. The gas diffusion barrier layer may be an aluminum layer.

WO 2019/007829 discloses the use of a mixture of polyethylene terephthalate glycol-modified resin and polystyrene based material for manufacturing the inner plastic liner of a refrigerator having improved resistance against chemical degradation caused by the diffusion of blowing agents like cyclopentane from the insulating polyurethane foam into the inner plastic liner.

US 2016/0363251 describes a double-wall pipe including an insulating foam and a gas permeation barrier layer made of polyethylene terephthalate for inhibiting the gas exchange between the insulating foam and the outer environment of the pipe.

Nevertheless, there is still the need for further improvements of the long-term properties of insulating foams, in particular of polyurethane foams, which should preferably be easy to implement.

Additionally, the insulated articles should withstand low temperatures which may for example occur during the transportation of the goods to the seller or customer in winter or in regions of harsh temperature conditions. At the same time the insulated articles offer good performance at elevated temperatures, which may for instance occur during transportation of the respective goods in summer or in regions of hot temperature conditions. Furthermore, these properties are requested in particular for hot media applications, such as piping or water heater applications.

SUMMARY OF THE INVENTION

It was therefore an objective of the present invention to provide thermal insulating elements with improved long-term properties, good stability both chemically and mechanically and simple production.

Accordingly, this object is achieved by a thermal insulation element comprising a closed-cell, rigid polyurethane foam which is at least partially covered by a layer system comprising at least one layer formed by a polybutylene terephthalate composition. Surprisingly, the use of polybutylene terephthalate (PBT) in a layer surrounding the polyurethane foam leads to an improved long-term stability of the insulation capacities of the thermal insulation element and improved properties after exposition to low temperatures. Depending on the specific application the PBT may be used a gas diffusion barrier layer in addition to existing structural elements of the respective application, but it is also possible to use PBT in structural elements of the specific application instead of materials used so far, e.g. use PBT instead of HIPS as material for the inner lining of a refrigerator or instead of PET as material for the outer wall of an insulated double-walled pipe.

Furthermore, this object is achieved by a cooling device, such as a refrigerator; a heat storage system; a water heater; a battery system; an insulation panel or board for buildings, trucks and trailers, window frames, doors, or garage doors; an insulated pipe; a mobile transport system; or an insulated transport box comprising said thermal insulation element, as well as by a process for producing such elements. This object is also achieved by the use of polybutylene terephthalate as gas diffusion barrier for closed-cell rigid polyurethane foams.

The inventive thermal insulation elements comprising a closed-cell, rigid polyurethane foam which is at least partially covered by a layer system comprising at least one layer formed by a polybutylene terephthalate composition show surprisingly lower heat conductivities after storage, i.e. better long-term stability than thermal insulation elements wherein the PBT layer is replaced by conventional facing materials like HIPS or even more advanced materials, such as a PET layer. These elements and the articles comprising them also show improved resistance to low temperature exposure and at least the same properties at elevated temperatures. Moreover, these elements offer improved mechanical resistance towards cell gases as part of the foams, like hydrofluorochlorocarbons, hydrofluorocarbons and hydrocarbons and tend not to lead to embrittlement.

DETAILED DESCRIPTION OF THE INVENTION

Figure 1A:
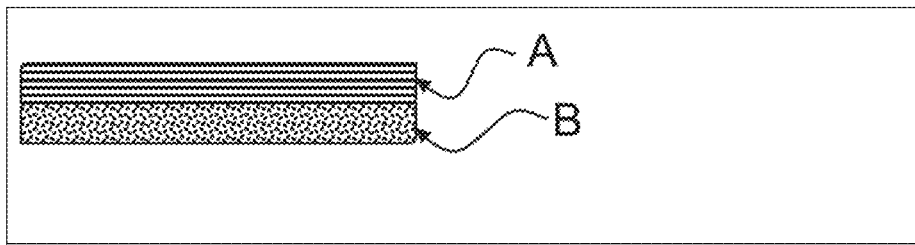
FIG. 1A shows a schematic drawing of a first example of a multilayered thermal insulation system.
Figure 1B:
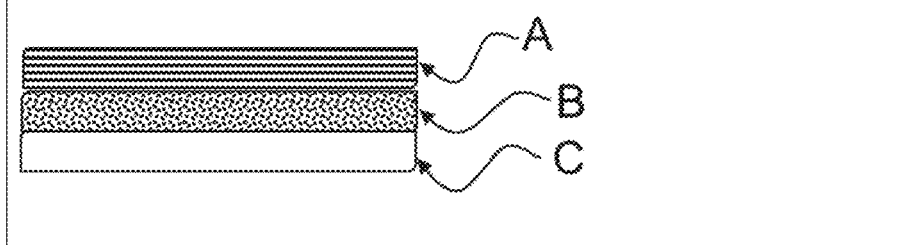
FIG. 1B shows a schematic drawing of a second example of a multilayered thermal insulation system.
Figure 1C:
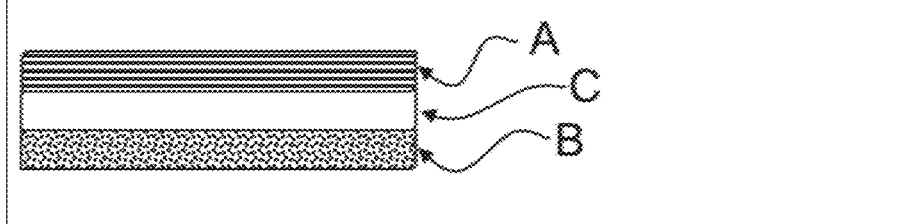
FIG. 1C shows a schematic drawing of a third example of a multilayered thermal insulation system.

In the following the invention is described in detail.

The thermal insulation element comprises at least one layer formed by a polybutylene terephthalate composition, which covers the insulating foam at least partially. The polybutylene terephthalate composition is hereinafter also referred to as PBT composition. This PBT composition may be made of polybutylene terephthalate or by a blend of polybutylene terephthalate and one or more furthers polymers, wherein the polybutylene terephthalate containing phase forms the continuous phase. The PBT and the PBT containing composition may contain usual polymer additives and fillers like flame retardants, stabilizers, plasticizers, nucleating agents, glass fibers and/or mineral fillers, provided PBT is the matrix polymer which forms the continuous matrix of the PBT composition. In this matrix, the other ingredients are included, e.g. in case of immiscible polymers or fillers in finely dispersed form.

Preferably the polybutylene terephthalate composition comprises at least 30 wt.-% polybutylene terephthalate, based on the total weight of the polybutylene terephthalate composition, more preferred at least 50 wt.-%, even more preferred at least 60 wt.-%, most preferred at least 65 wt.-% and in particular preferred at least 75 wt.-% polybutylene terephthalate, based on the total weight of the PBT composition.

Preferred PBT to be used has a viscosity number in the range of from 80 to 200 mL/g, preferably from 90 to 190 mL/g, measured in 0.5 wt % solution in a phenol/o-dichlorobenzene mixture (weight ratio 1:1) at 25° C. in accordance with ISO 1628 valid in 2012.

The PBT preferably has a terminal carboxy group content of up to 100 meq/kg of polyester, preferably up to 40 meq/kg of polyester and in particular up to 30 meq/kg of polyester. Polyesters of this type can by way of example be produced by the process of DE-A 44 01 055. Terminal carboxy group content is usually determined by titration methods (e.g. potentiometry).

Particularly preferred PBTs are produced with Ti catalysts. Residual Ti content of these after the polymerization process is preferably less than 250 ppm, more preferably less 200 ppm, particularly less than 150 ppm.

The polybutylene terephthalate composition may comprise at least one additional polymer. The additional polymer may be selected from thermoplastic polymers. Preferably the PBT composition comprises at least one additional polymer selected from thermoplastic polymers having a lower melting point (or Tg in case of amorphous polymers) than PBT. Polybutylene terephthalate is a thermoplastic engineering having a melting point of 222 to 225° C., typically 223° C. By adding a lower-melting thermoplastic polymer into the PBT composition the temperature window in which thermoforming of PBT can be performed can be broadened. This has the ad-vantage, that the PBT composition may be processed easily by thermoforming like the polymers/polymer blends used so far in thermal insulating devices such as HIPS and PET. All thermoplastic polymers having a lower melting point (or Tg in case of amorphous polymers) than PBT can be employed. However, it is preferred that the thermoplastic polymer can be easily dispersed in the PBT matrix and remains dispersed in the PBT matrix without showing large-scale phase separation during the thermoforming process. Thus, thermoplastic polymers are preferred which are chemically similar to PBT.

Preferably the at least one additional thermoplastic polymer has a melting point below 220° C., more preferred below 200° C., even more preferred below 180° C., and most preferred below 160° C. The melting point can be determined by differential scanning calorimetry (DSC) at a heating rate of 20° C./min, according to ISO 11357-1/-3 valid in 2019.

The at least one additional polymer is preferably selected from the group of thermoplastic polymers consisting of polyesters based on aliphatic and/or aromatic dicarboxylic acids and on aliphatic dihydroxy compounds; thermoplastic elastomers; copolymers of acrylic ester, styrene and acrylonitrile; polylactic acid; polypropylene; polyethylene, and mixtures thereof. More preferred the polybutylene terephthalate composition comprises at least one additional polymer selected from polyester based on aliphatic and aromatic dicarboxylic acids and on aliphatic dihydroxy compounds.

The amount of the thermoplastic polymer is preferably 5 to 40 wt %, more preferably 10 to 30 wt %, most preferably 15 to 25 wt %, based on the total amount of polybutylene terephthalate composition, which is 100 wt %.

Preferred Polybutylene Terephthalate Compositions Comprise a) 50 to 95 wt % of polybutylene terephthalate as component A, b) 5 to 50 wt % of at least one additional polymer as component B, c) 0 to 30 wt % of mineral filler as component C, and d) 0 to 20 wt % of further additives as component D, based on the total weight of the polybutylene terephthalate composition Further ingredients of the PBT compositions can be mineral fillers and further additives.

If a mineral filler is present, it is preferably present at 5 to 30 wt %. The upper limit of component A is then reduced to 90 wt %, so that the sum of wt % does not exceed 100 wt %. If a mineral filler is present, the amount is more preferably 7 to 15 wt %, most preferably 8 to 12 wt %, for example approximately 10 wt %, the upper limit of component A being reduced accordingly.

Component B is preferably employed in an amount of from 10 to 30 wt %, more preferably 15 to 25 wt %.

The amount of further additives is 0 to 20 wt %, more preferably 0 to 10 wt %, most preferably 0 to 5 wt %.

The amount of component A consequently is preferably 50 to 83 wt %, most preferably 50 to 77 wt %.

If further additives are present, their minimum amount is preferably 0.1 wt %, more preferably 0.3 wt %. The upper limit of component A is reduced in this case by 0.1 wt % or preferably 0.3 wt %, so that the total of components A to D is 100 wt %.

By adding mineral fillers, an accurate reproduction of surface detail can be achieved.

In principle, any of the polyesters based on aliphatic and aromatic dicarboxylic acids and on aliphatic dihydroxy compounds, known as semi-aromatic polyesters, may be used as component B for preparation of the PBT compositions. Mixtures of two or more of these polyesters are of course also suitable as component B.

According to the invention, the term "semiaromatic polyesters" is also intended to include polyester derivatives, such as polyetheresters, polyesteramides, or polyetheresteramides. Among the suitable semiaromatic polyesters are linear non-chain-extended polyesters (WO 92/09654). Preference is given to chain-extended and/or branched semiaromatic polyesters. The latter are disclosed in the specifications of WO 96/15173-15176, WO 21689-21692, WO 25446, WO 25448, WO 98/12242, expressly incorporated herein by way of reference. Mixtures of different semiaromatic polyesters may also be used. In particular, the term semiaromatic polyesters is intended to mean products such as Ecoflex® (BASF SE) and Eastar© Bio (Novamont).

Detailed information about PBT compositions containing at least one further thermoplastic polymer which are in particular suited to be used in the present invention are provided in the not yet published European patent application with application Ser. No. 19/168,782.1, which is expressly incorporated herein by way of reference.

The thickness of the polybutylene terephthalate layer comprised in the layer system may vary widely and depends on whether the polybutylene terephthalate layer is only or mainly used as gas diffusion barrier layer or whether it should also fulfill additional purposes like imparting mechanical or chemical stability. The polybutylene terephthalate layer has usually a thickness of from 0.005 to 500 mm, preferably of from 0.006 to 100 mm, more preferred of from 0.007 to 50 mm, even more preferred of 0.008 to 25 mm and in particular preferred of from 0.01 to 5 mm.

The layer system may consist of one layer formed by a polybutylene terephthalate composition or the layer system may comprise one, two or more layers in addition to the at least one layer formed by a polybutylene terephthalate composition. The layer system may also comprise two layers formed by a polybutylene terephthalate composition separated by a third layer different from the two layers formed by a polybutylene terephthalate composition.

According to one embodiment the layer system comprises at least one second layer selected from metal layers, paper layers, coated paper layers and polymer layers. The polymer layer may be chosen from HIPS, ABS, polyolefins like PE (polyethylene) and/or PP (polypropylene), polyesters like PLA (polylactide acid) and PBAT (polybutylenadipate terephthalate), and polyamides like PA 6 and PA 66. These polymers may of course contain further additives usually used for polymers liked plasticizers, flame retardants, stabilizer etc. A second layer may be added e.g. for decorative purposes, to enhance the chemical and/or mechanical stability or to allow the use of cost-efficient materials in addition to smaller amounts of PBT. The presence of a second layer is in particular useful in case the polybutylene terephthalate layer is mainly or only used as gas diffusion barrier. However, a second layer could also be introduced in order to further in-crease barrier properties, for example to reduce vapor diffusion.

According to one embodiment the layer system comprises at least one second polymer layer. Preferably the layer system comprising at least one second polymer layer is prepared by coextrusion of the polybutylene terephthalate layer and the at least one second polymer layer. The polymer for the second polymer layer may be selected from polymers known to be processed by thermoforming, e.g. polyolefins like PE and/or PP, polyesters like PLA and PBAT, HIPS, ABS, EVOH and polyamides like PA 6 and PA 66.

The layer system comprising at least one layer formed by a polybutylene terephthalate composition may be directly or indirectly attached to the closed-cell, rigid polyurethane foam. In case the layer system is not directly attached to the to the closed-cell, rigid polyurethane foam, there may be one or more further layers provided between the closed-cell rigid polyurethane foam and the layer system, e.g. an adhesive layer, an adhesive promotor layer, a vacuum insulation panel (VIP), a flame retardant barrier layer or additional polymer layers made of the polymeric compounds described above for the possible additional polymer layer of the layer system. In case a VIP is provided between the layer system and the closed-cell, rigid polyurethane foam, there may also be one or more fixation means like adhesive tapes placed between the layer system and the VIP to fixate the VIP at the layer system during the subsequent foaming process of the closed-cell, rigid polyurethane foam. Preferably the polybutylene terephthalate layer system is directly attached to the closed-cell rigid polyurethane foam or a VIP optionally including fixation means is present between the layer system and the closed-cell, rigid polyurethane foam.

Figure 1D:
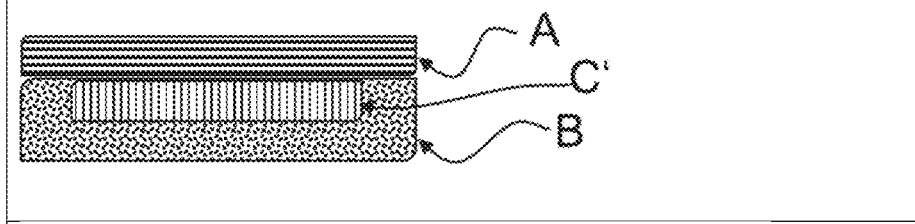
FIG. 1D shows a schematic drawing of a fourth example of a multilayered thermal insulation system.
Figure 1E:
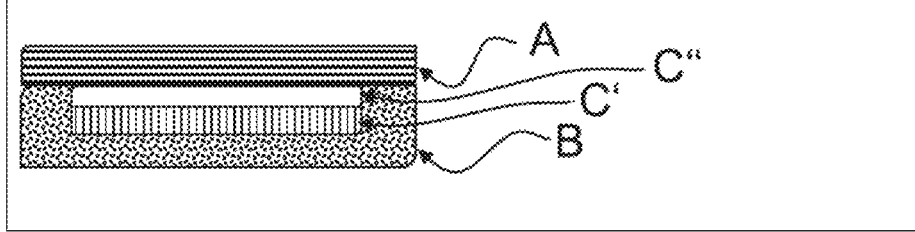
FIG. 1E shows a schematic drawing of a fifth example of a multilayered thermal insulation system.

The thermal insulation element comprises a closed-cell, rigid polyurethane foam, which is at least partially covered by the layer system comprising at least one layer formed by a polybutylene terephthalate composition. The terms "covered" and "surrounded" are used interchangeably herein. The closed-cell, rigid polyurethane foam is preferably present in form of a layer and the thermal insulation element may also be considered as a multilayered thermal insulation system comprising at least one layer of a closed-cell, rigid polyurethane foam and at least one layer system comprising at least one layer formed by a polybutylene terephthalate composition. The multilayered thermal insulation system may comprise additional layers, e.g. made of metal or polymer compositions, an adhesive layer, an adhesive pronator layer, a vacuum insulation panel (VIP) or a flame-retardant harrier layer. In FIGS. 1A-1E schematic drawings of examples of such multilayered systems are shown. In FIGS. 1A-1E the abbreviation "A" denotes a layer formed by the polybutylene terephthalate composition, "B" denotes a layer made of the closed-cell, rigid polyurethane foam, "C" a third layer as described herein. "C" third layer made of a VIP and "C"a layer made of adhesive tapes as described above. According to one embodiment, the thermal insulation element is a multilayered system comprising at least one layer of the polybutylene terephthalate composition, at least one layer of the closed-cell, rigid polyurethane foam, and at least one third layer, wherein the third layer may be located between the layer made of the closed-cell, rigid polyurethane foam and the layer formed by the polybutylene terephthalate composition (like FIG. 1B) or the third layer is located on the side of the closed-cell, rigid polyurethane foam opposed to the layer formed by the polybutylene terephthalate composition (like FIG. 1C). FIG. 1A shows a thermal insulation system consisting of layer formed by the polybutylene terephthalate composition and a layer of the closed-cell, rigid polyurethane foam. FIG. 1D shows a thermal insulation system comprising a layer formed by the polybutylene terephthalate composition and a layer of the closed-cell, rigid polyurethane foam, wherein a VIP (C') is provided between the layer formed by the polybutylene terephthalate composition and a layer of the closed-cell, rigid polyurethane foam. The thermal insulation element of FIG. 1E is similar to the one shown in FIG. 1D except that additionally an adhesive tape (C") is placed between the VIP and the layer formed by the polybutylene terephthalate composition.

According to a preferred embodiment, the layer system is processable by thermoforming, in particular preferred the layer system is formed into the desired shape by thermoforming.

The layer system surrounds the closed-cell rigid polyurethane foam at least partially. The terms "surrounded" and "covered" as used herein mean that the insulation foam is covered by the layer system to prevent diffusion of gases contained in the foam out of the foam and of gases present outside into the insulating foam. The exact percentage of the surface of the foam surrounded or covered by the layer system depends on the specific application of the thermal insulation element. E.g. in case of a refrigerator wherein the external wall is made of a metal casing and the inner lining is formed by the layer system comprising a PBT layer with the insulating foam placed between the external wall and the inner lining or in case of a double walled pipe wherein the layer system forms the outer wall and the inner wall is made of a different material, the surface of the foam surrounded by the layer system may be about 50%. In case of an insulation construction board made of a closed-cell rigid polyurethane foam placed between two sheets of the layer system comprising a PBT layer the area surrounded by the layer system may be close to 90% or even higher. Preferably, the term "at least partially surrounded" means, that at least 10% of the surface of the insulating foam is surrounded or covered by the layer system, more preferred at least 20% and even more preferred at least 25% of the insulating foam is surrounded by the layer system.

The thermal insulation element comprises a closed-cell rigid polyurethane foam. The term "closed cell" as used herein means that the foam has a content of open cells of up to 20%, preferred up to 10% and most preferred up to 5%, see Polyurethane Handbook, $2^{nd}$ edition, 1993, editor Guenter Oertel, Carl Hanser Verlag Munich, Chapter 6.3.1.4. The content of open cells may be determined according to DIN EN ISO 4590 valid in 2016. Such foams are known to the person skilled in the art and are especially valued for their thermal insulation properties. The term "polyurethane" is known by the person skilled in the art as including not only polymers containing urethane groups but as also including polymers containing no or very low amounts of urethane groups, as long as these polymers are derived from difunctional or polyfunctional isocyanates, see Polyurethane Handbook, $2^{nd}$ edition 1993, editor Guenter Oertel, Carl Hanser Verlag Munich, Chapter 2.1.1. Examples are polyetherureas, polyisocyanurates, polyureas and polycarbodiimides.

Rigid polyurethane (PU) foams can be produced in a known manner by reacting organic polyisocyanates with one or more compounds containing at least two reactive hydrogen atoms, preferably polyamines, polyether, polyester and/or polyether ester alcohols (polyols), in the presence of blowing agents, catalysts and optionally auxiliaries and/or additives, such as surfactants/stabilizer and/or flame retardants. The mixture containing all the reactants and additives for producing the PU foam is hereinafter also called polyurethane reaction mixture. The preparation of closed-cell rigid polyurethane foams and their application is e.g. described in Polyurethane Handbook, $2^{nd}$ edition, editor Guenter Oertel, Hanser Publishers Munich 1993, Chapter 6.

As organic isocyanates, it is possible to use all usual aliphatic, cycloaliphatic and preferably aromatic diisocyanates and/or polyisocyanates. As preferred isocyanates, it is possible to use toluylene diisocyanate (TDI) and/or diphenylmethane diisocyanate (MDI), preferably MDI, an particularly preferably mixtures of MDI and polymeric diphenylmethane diisocyanate (PMDI). These particularly preferred isocyanates can have been modified fully or partially with uretdione, carbamate, isocyanurate, carbodiimide or allophanate groups. Furthermore, prepolymers and mixtures of the above-described isocyanates and prepolymers can be used as isocyanate component. These prepolymers are prepared from the above-described isocyanates and the poly-ethers, polyesters or both described below and have an NCO content of usually from 14 to 32% by weight, preferably from 22 to 30% by weight. As relatively high molecular weight compounds having groups which are reactive toward isocyanates, it is possible to use all compounds which have at least two groups which are reactive toward isocyanates, e.g. OH—, SH—, NH— and CH— acid groups. It is usual to use polyetherols and/or polyesterols having from 2 to 8, preferably from 2 to 6, hydrogen atoms which are reactive toward isocyanate. The OH number of these compounds is usually in the range from 30 to 850 mg KOH/g, preferably in the range from 100 to 500 mg KOH/g. The polyetherols are obtained by known methods, for example by anionic polymerization of alkylene oxides with addition of at least one starter molecule comprising from 2 to 8, preferably from 2 to 6, reactive hydrogen atoms in bound form in the presence of catalysts. As catalysts, it is possible to use alkali metal hydroxides such as sodium hydroxide or potassium hydroxide or alkali metal alkoxides such as sodium methoxide, sodium or potassium ethoxide or potassium isopropoxide, or in the case of cationic polymerization Lewis acids such as antimony pentachloride, boron trifluoride etherate or bleaching earth as catalysts. Furthermore, double metal cyanide compounds, known as DMC catalysts, can also be used as catalysts. Furthermore, polyetherols can be prepared using amines as catalyst as for example disclosed in WO2011/134866 or WO 2011/134856 A1.

Preference is given to using one or more compounds having from 2 to 4 carbon atoms in the alkylene radical, e.g. ethylene oxide, 1,2-propylene oxide, tetrahydrofuran, 1,3-propylene oxide, 1,2- or 2,3-butylene oxide, in each case either alone or in the form of mixtures, particularly preferably ethylene oxide and/or 1,2-propylene oxide, as alkylene oxides. Possible starter molecules are, for example, ethylene glycol, diethylene glycol, glycerol, trimethylolpropane, pentaerythritol, sugar derivatives such as sucrose, hexitol derivatives such as sorbitol, also methylamine, ethylamine, isopropylamine, butylamine, benzylamine, aniline, toluidine, toluenediamine, in particular vicinal toluenediamine, naphthylamine, ethylenediamine, di-ethylenetriamine, 4,4'-methylenedianiline, 1,3,-propanediamine, 1,6-hexanediamine, ethanolamine, diethanolamine, triethanolamine and other dihydric or polyhydric alcohols or monofunctional or polyfunctional amines. Preference is given to ethylene glycol, diethylene glycol, glycerol, trimethylolpropane, pentaerythritol, sugar derivatives such as sucrose and hexitol derivatives such as sorbitol and TDA, preferably vic-TDA. The polyester alcohols used are usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned. As further starting materials in the preparation of the polyesters, it is also possible to make concomitant use of hydrophobic materials. The hydrophobic materials are water-insoluble materials which comprise a nonpolar organic radical and have at least one reactive group selected from among hydroxyl, carboxylic acid, carboxylic ester or mixtures thereof. The equivalent weight of the hydrophobic materials is preferably in the range from 130 to 1000 g/mol. It is possible to use, for example, fatty acids such as stearic acid, oleic acid, palmitic acid, lauric acid or linoleic acid and also fats and oils such as castor oil, maize oil, sunflower oil, soybean oil, coconut oil, olive oil or tall oil.

The polyesterols used preferably have a functionality of from 1.5 to 5, particularly preferably from 1.8 to 3.5. If isocyanate prepolymers are used as isocyanates, the content of compounds having groups which are reactive toward isocyanates is calculated with inclusion of the compounds having groups which are reactive toward isocyanates used for preparing the isocyanate prepolymers.

The foam forming composition used in the process according to the present invention thus preferably is a composition which is suitable to prepare a polyurethane foam. The foam forming composition used in the process according to the present invention is a composition which is suitable to prepare a rigid polyurethane foam with a lambda value in the range of from 16 to 35 mW/(m*K), in particular in the range of from 17 to 33 mW/(m*K), more preferably in the range of from 18 to 26 mW/(m*K).

The closed-cell rigid polyurethane foam of the inventive thermal insulation element is usually prepared by means of at least one blowing agent selected from non-halogenated hydrocarbons, partially halogenated hydrocarbons and/or water.

Examples of partially halogenated hydrocarbons are $C_2$ to $C_6$ fluoroalkenes, particularly preferably $C_3$ to $C_6$ fluoroalkenes like propenes, butenes, pentenes and hexenes having 3 to 6 fluorine substituents, where other substituents such as chlorine may be present, examples are tetra-fluoropropenes, fluorochloropropenes like trifluoromonochloropropenes, pentafluoropropenes, fluorochlorobutenes, hexafluorobutenes or mixtures thereof.

Fluorinated alkenes that are particularly preferred as blowing agents used for the preparation of the closed-cell rigid polyurethane foam are selected from the group, but not limited to, consisting of cis- or trans-1,3,3,3-tetrafluoroprop-1-ene, 1,1,1-trifluoro-2-chloroprop-1-ene, 1-chloro-3,3,3-trifluoroprop-1-ene, 1-chloro-2,3,3,3-tetrafluoroprop-1-ene, in cis or transform, 1,1,1,2,3-pentafluoroprop-1-ene, in cis or trans form, 1,1,1,4,4,4-hexafluorobut-2-ene, 1-bromopentafluoroprop-1-ene, 2-bromopentafluoroprop-1-ene, 3-bromopentafluoroprop-1-ene, 1,1,2,3,3,4,4-heptafluoro-1-butene, 3,3,4,4,5,5,5-heptafluoro-1-pentene, 1-bromo-2,3,3,3-tetra-fluoroprop-1-ene, 2-bromo-1,3,3,3-tetrafluoroprop-1-ene, 3-bromo-1,1,3,3-tetrafluoroprop-1-ene, 2-bromo-3,3,3-trifluoroprop-1-ene, (E)-1-bromo-3,3,3-trifluoroprop-1-ene, 3,3,3-trifluoro-2-(tri-fluoromethyl)prop-1-ene, 1-chloro-3,3,3-trifluoroprop-1-ene, 2-chloro-3,3,3-trifluoroprop-1-ene, 1,1,1-trifluoro-2-butene and mixtures thereof.

Examples of non-halogenated hydrocarbon blowing agents are acyclic pentane isomers and/or cyclopentane, especially cyclopentane. Preference is given to using acyclic pentane isomers and/or cyclopentane in the range from 9% to 17% by weight, based on the total amount of the polyurethane reaction mixture. Preference is given to cyclopentane and mixtures of isopentane with cyclopentane having a content of at least 70% by weight of cyclopentane, and particular preference is given to using cyclopentane having a purity of at least 90% by weight, especially of at least 95% by weight.

Water is a chemical blowing agent which is especially preferably employed at a concentration of 1% to 8% by weight, preferably of 1.2% to 6%, more preferably 1.4% to 5% most preferably 1.5% to 3.5% by weight based on the total amount of polyurethane reaction mixture without physical blowing agent(s).

As catalysts, it is possible to use all compounds which accelerate the isocyanate-water reaction or the isocyanate-polyol reaction. Such compounds are known and are described, for example, in "Kunststoffhandbuch, volume 7, Polyurethane", Carl Hanser Verlag, 3rd edition 1993, chapter 3.4.1. These include amine-based catalysts and catalysts based on organic metal compounds. As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or alkali metal salts of carboxylic acids, e.g. potassium acetate or potassium formate.

Preference is given to using a mixture comprising at least one tertiary amine as catalyst. These tertiary amines may also bear groups which are reactive toward isocyanate, e.g. OH, NH or $NH_2$ groups. Some of the most frequently used catalysts are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene and diazabicyclononene. Preference is given to using mixtures comprising at least two different tertiary amines as catalysts.

Foam stabilizers are materials which promote formation of a regular cell structure during foaming. Examples are: silicone-comprising foam stabilizers such as siloxaneoxalkylene copolymers and other organopolysiloxanes. Also alkoxylation products of fatty alcohols, oxo alcohols, fatty amines, alkylphenols, dialkylphenols, alkylcresoles, alkylresorcinol, naphthol, alkylnaphthol, naphthylamine, aniline, alkylaniline, toluidine, bisphenol A, alkylated bisphenol A, polyvinyl alcohol and also alkoxylation products of condensation products of formaldehyde and alkylphenols, formaldehyde and dialkylphenols, formaldehyde and alkylcresoles, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers. Foam stabilizers are preferably used in an amount of from 0.5 to 5% by weight, particularly preferably from 1 to 3% by weight, based on the total weight of the components.

Optionally flame retardants might be used as additives for the rigid foam. As flame retardants, it is generally possible to use the flame retardants known from the prior art. Suitable flame retardants are, for example, nonincorporable brominated substances, brominated esters, brominated ethers (Ixol) or brominated alcohols such as dibromoneopentyl alcohol, tribromoneopentyl alcohol and PHT-4-diol and also chlorinated phosphates such as tris(2-chloroethyl) phosphate, tris(2-chloropropyl) phosphate (TCPP), tris(1,3-dichloropropyl) phosphate, tricresyl phosphate, tris(2,3-dibromopropyl) phosphate, tetrakis(2-chloroethyl) ethylenediphosphate, dimethyl methanephosphonate, diethyl diethanolaminomethyl-phosphonate and also commercial halogen-comprising flame retardant polyols. It is possible to use phosphates or phosphonates such as diethyl ethanephosphonate (DEEP), triethyl phosphate (TEP), dimethyl propylphosphonate (DMPP), diphenyl cresyl phosphate (DPK) and others as further liquid flame retardants. Apart from the abovementioned flame retardants, it is possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and optionally maize starch or ammonium polyphosphate, melamine, expandable graphite and optionally aromatic polyesters for making the rigid polyurethane foams flame resistant. Preferable flame retardants are the recited phosphorus-containing flame retardants, particular preference being given to dimethyl propylphosphonate (DMPP), diethyl ethanephosphonate (DEEP), triethyl phosphate (TEP), diphenyl cresyl phosphate (DPK), triphenyl phosphate (TPP) and tris-(2-chloropropyl) phosphate (TCPP), with special preference being given to TCPP.

Further auxiliaries and/or additives can optionally be added to the reaction mixture for producing the rigid polyurethane foams. Mention may be made of, for example, surface-active substances, cell regulators, fillers, dyes, pigments, flame retardants, hydrolysis inhibitors, fungistatic and bacteriostatic substances.

Preferably, the closed-cell rigid polyurethane foam used in the thermal insulation element has a free rise density of at maximum 200 g/L, preferably of from 15 to 200 g/L, more preferred of from 16 to 150 g/L even more preferred of from 18 to 80 g/L, most preferred of from 20 to 60 g/L.

A further object of the present invention is the use of polybutylene terephthalate as gas diffusion barrier for closed-cell polyurethane foams. For this purpose, the polybutylene terephthalate may be applied as described above, e.g. a layer system comprising at least one layer formed by a polybutylene terephthalate composition as described above is applied to a closed-cell polyurethane foam, e.g. the closed-cell polyurethane foam is at least partially surrounded by the layer system.

The thermal insulating elements described herein may be used in a very broad range of applications. Therefore, another object of the present invention are articles having a thermal insulating function which comprise a thermal insulation element as described above. Such articles can be cooling devices such as refrigerators and freezers; heat storage systems like boilers; water heaters; battery systems; insulation panels and boards for buildings, trucks and trailers, for window frames and doors like entry and garage doors; insulated pipes e.g. for long distance heating; mobile transport systems like tank wagons and trucks and refrigerated trucks; and insulated transport boxes e.g. for hot or frozen food or for pharmaceuticals or medical purposes.

A further object of the present invention is a process for producing a thermal insulation element as described herein by providing the layer system and optionally further wall-forming parts and preparing the closed-cell rigid polyurethane foam in situ by applying the polyurethane reaction mixture in direct contact to the layer system, i.e. the polyurethane foam is prepared directly in contact with the layer system by foaming the polyurethane reaction mixture in situ. This process is especially suited for devices wherein the layer system constitutes a wall of the device, e.g. for refrigerators and freezers wherein the inner lining is formed by the layer system or a double-walled pipe, wherein the inner and/or outer wall is formed by the layer system and the polyurethane foam is prepared directly within the cavity formed by the layer system(s) and optionally further wall-forming parts.

In a Preferred Embodiment, the Process for Producing a Thermal Insulation Element Comprises the Steps i) Providing a layer system as described above, ii) Thermoforming of the layer system into the desired shape, iii) Arranging the thermoformed layer system and optional further walls forming parts of the thermal insulation element such that the closed-cell rigid polyurethane foam can be applied to form the thermal insulation element, and iv) Applying the polyurethane reaction mixture in direct contact to the layer system and foaming in situ of the polyurethane reaction mixture.

To produce thermal insulation elements comprising more than a polybutylene terephthalate layer and a rigid closed-cell polyurethane foam a third layer may be added between step iii) and step (iv), e.g. by spraying an adhesive enhancing layer on the layer system or placing adhesive tape(s) to the layer system and providing a VIP on these adhesive tape(s).

The invention is illustrated in more detail by the following examples without limiting the invention.

EXAMPLES

1. Measurement methods:

Cream Time:

The time from the commencement of mixing of the reaction mixture to the start of foam expansion. In Table 1 the cream time is denoted as start time.

String time (also named gel time or setting time)

Time from the commencement of mixing of the reaction mixture up to the time until it is possible to draw threads in contact with the foam (for example with a wooden rod). This point thus represents the transition from a liquid to a solid state.

Minimum fill density for a component/free rise density:

The minimum fill density is determined by introducing, into a mold of dimensions 2000×200×50 mm at a mold temperature of 45±2° C., an amount of polyurethane reaction mixture sufficient for the foam to exactly fill the mold without coming into contact with the end of the mold. The length of the flow path is measured and the minimum fill density calculated according to MFD=(m*L/(V*s)), where m=mass, L=length of the mold, s=flow path and V=volume of the mold. The free rise density is determined by foaming the polyurethane reaction mixture into a plastic bag at room temperature. The density is determined on a cube removed from the center of the foamed plastic bag.

Thermal Conductivity:

Thermal conductivity is determined using a Taurus TCA300 DTX apparatus at an average temperature of 10° C. For production of the test specimen, the polyurethane reaction mixture is introduced into a mold of dimensions 2000×200×50 mm (15% degree of overpacking) and demolded after 5 min. After storage for 24 hours under standard climatic conditions, a plurality of foam cuboids (positions 10, 900 and 1700 mm with respect to the start of the lance) of dimensions 200×200×50 mm are cut out from the center. Subsequently, the top and bottom sides are removed so that test specimens of dimensions 200×200×30 mm are obtained.

Thermal Cycling Test

A PUR rigid foam sample covered with a facing material runs through a temperature cycling test in that way that the temperature increases in 3 cycles each from −30° C. up to 60° C. over a period of 11 h.

Gas Permeation:

Oxygen Transmission Rates [$cm^3 \cdot \mu m/d \cdot bar \cdot m^2$] have been obtained at 23° C. and 85% relative humidity. The tests have been performed according to ASTM F1927-07.

Chemical Resistance Against Blowing Agents:

A sample of the respective facing material was placed in polyol blend (polyol comoponent A from table 1) equipped with the respective blowing agent (Cyclopentan 95:10 pbw (parts by weight) per 100 pbw polyol blend; HCFO, 1233zd (E), trans-1-chloro-3,3,3-trifluoropropene: 20 pbw per 100 pbw polyol blend) and stored at room temperature over 4 weeks. From these samples tensile strength bars were prepared and tensile strength was analyzed after 14 and 28 days. The initial tensile strength values were obtained from the facing material samples without treatment with a polyol blend.

Tensile Strength

Tensile strength was measured according to DIN 53504.

II. Feedstocks

Polyol A): Polyether polyol based on sucrose, glycerol and PO having an OH number of 450 mg KOH/g; functionality: 5.1

Polyol B): Polyether polyol based on vic-TDA and PO having an OH number of 399 mg KOH/g; functionality: 3.9*

Polyol C): Polyether polyol based on vic-TDA, ethylene oxide (EO) and PO having an OH number of 160 mg KOH/g; functionality: 3.9*

* The functionality for polyols B and C is <4.0 due to the presence of small amounts of water that were added via addition of the catalyst (aqueous KOH solution) to the starter TDA.

Catalyst mixture D) consisting of:

Catalyst D1): Dimethylcyclohexylamine

Catalyst D2): Pentamethyldiethylenetriamine or bis(2-dimethylaminoethyl) ether

Catalyst D3): Tris(dimethylaminopropyl)hexahydro-1,3,5-triazine

Catalyst D4): Dimethylbenzylamine

Stabilizer E):

Silicone-containing foam stabilizer, Tegostab B 84204® from Evonik

Propylenecarbonate

Cyclopentane 95 (CP 95): Cyclopentane having 95% purity

HCFO: 1233zd(E); trans-1-chloro-3,3,3-trifluoropropene

Furthermore, 13.5 pbw of cyclopentane 95 was additionally added to each polyol component, based on the total weight of the polyol components A) to C) plus D, E and propylene carbonate (in order to generate the foams).

10 pbw of cyclopentane 95 or 20 pbw of HCFO (1233zd (E); trans-1-chloro-3,3,3-trifluoropropene) was additionally added to each polyol component, based on the total weight of the polyol components A) to C) plus D, E and propylene carbonate and subsequently used for tests of chemical resistance for PU rigid foam blowing agents.

Isocyanate:

Polymeric MDI having an NCO content of 31.5% by weight (Lupranat® M20)

Facing Materials:

Sheet Metal (Steel)

High impact polystyrene (HIPS, Styron A-Tech 1175 from Trinseo)

Acrylonitrile butadiene styrene (ABS, Röchling® ABS glossy)

Polyethylene terephthalate (PET; PET RT52 from Invista)

Polybutylene terephthalate (PBT; e.g. Ultradur® B4520 un from BASF)

III. Rigid PU Foams

Polyol components P) were prepared from the aforementioned feedstocks, to which components a physical blowing agent was added prior to foaming. By means of a high-pressure Puromat® PU 30/80 IQ (Elastogran GmbH) having a discharge rate of 250 g/s, the polyol components P) admixed with the physical blowing agent were each mixed with the required amount of the specified isocyanate, so that the desired isocyanate index was achieved.

The reaction mixture was injected into molds adjusted to a temperature of 40° C. and having dimensions of 2000 mm×200 mm×50 mm and allowed to foam up therein. The degree of overpacking was 17.5%, that is 17.5% more reaction mixture was used than would have been necessary to completely foam-fill the mold. The resulting specimens with a thickness of 50 mm are stored at a temperature $T_a$ in a range between 21° C. and 24° C. or at a temperature $T_b$ of 70° C.

Thermal conductivity were measured over time. In case a facing was used to shield the foam the respective facing material (steel, HIPS, ABS, PET, PBT) was placed on the top and the bottom of the mold prior the foaming step, so that a sample derives which is covered by the respective layer material.

The cream time, setting time/string time and free rise density were ascertained by means of high-pressure mixing by machine (by means of a high-pressure Puromat® PU 30/80 IQ) and introduction into a PE bag. In this case, 900 g*100 g of material are inserted into the PE bag (diameter* 30 cm). If no processing by machine is possible (e.g. on account of inhomogeneities in the polyol component), the cream time, setting time and free foam density were determined by means of a beaker test by means of manual foaming. The components in this case are adjusted to a temperature of 20±0.5° C. The polyol component was initially charged in the corresponding paper cup, the isocyanate component was weighed in and the reaction mixture was stirred. The stopwatch is started at the beginning of stirring. The cream time is defined here as the period of time between the beginning of stirring and the start of volume expansion of the reaction mixture by means of foam formation. The setting time (fiber time) corresponds to the time from the beginning of mixing up to the time in the reaction process at which threads can be pulled out from the foam composition using a glass bar. In order to ascertain the free rise density in a cup test, the foam head is cut off after the foam has cured. The cut is made perpendicularly to the rise direction on the edge of the testing cup, with the result that the foam cutting face and the upper edge of the testing cup lie in one plane. The content of the cup is weighed and the free rise density is calculated.

Table 1 shows the data for the production of the PUR used and table 2 shows the measurement results for the rigid PU foams produced therefrom (degree of overpacking OP of the molded foams: 17.5%). Examples E1, E2 and E3 are inventive examples, examples CE1 to CE8 are comparative examples. Table 3 illustrates the respective gas barrier properties of PET (comparison) and PBT (inventive) by means of oxygen as indication for the diffusion of air. Table 4 show the results of a thermal cycling test.

TABLE 1

Polyol component and resulting PUR rigid foam.

| Component//Property | Polyol component [ppw] |
|---|---|
| Polyol A | 52 |
| Polyol B | 30 |
| Polyol C | 9.1 |
| Propylene carbonate | 1 |
| Stabilizer | 3 |
| Catalyst package | 2.4 |
| $H_2O$ | 2.5 |
| Sum polyol component (A) | 100 |
| Cyclopentan 95 | 13.5 |
| NCO-Index | 120 |

| Machine Data | |
|---|---|
| Start time [s] | 4 |
| String time [s] | 44 |
| Free room density [g/L] | 23.3 |
| Minimum filling density [g/L] | 31.4 |
| Overpacking [s] | 17.5 |

Table 2a and 2b. Ageing study at $T_a$ and $T_b$. Comparison of PBT vs. standard materials.

2a. Ageing at $T_a$ (21-24° C.)

| | CE1 | CE2 | CE3 | E1 |
|---|---|---|---|---|
| Facing Material/Layer | none | steel[b] | HIPS | PBT |
| Layer thickness [mm] | — | 0.5 | 1 | 0.6 |
| Foam thickness [mm] | 50 | 50 | 50 | 50 |
| Time (days) | 1    120 | 1    120 | 1    120 | 1    120 |
| $TC^a$ [mW/mK] | 19.5    23.6 | 19.6    19.8 | 19.5    20.5 | 19.6    19.7 |

2b. Ageing at $T_b$ (70° C.)

| | CE4 | CE5 | CE6 | E2 |
|---|---|---|---|---|
| Facing Material/Layer | none | steel[b] | HIPS | PBT |
| Layer thickness [mm] | — | 0.5 | 1 | 0.6 |
| Foam thickness [mm] | 50 | 50 | 50 | 50 |
| Time (days) | 1    120 | 1    120 | 1    120 | 1    120 |
| $TC^a$ [mW/mK] | 19.2    23.4 | 19.5    19.7 | 19.2    21.8 | 19.5    19.7 |

[a]TC: Thermal conductivity; Lambda-value in mW/mK;

[b]steel as a sheet metal

TABLE 3

Comparison of gas diffusion of PBT (invention) in contrast to PET (comparison).

| Oxygen Transmission Rates [cm³ · μm/d · bar · m²] | PET | PBT |
|---|---|---|
| Injection molded plaque 1 mm thickness | 2660 | 1910 |
| Extruded film 1 mm thickness | 2910 | 1910 |

TABLE 4

Thermal cycling test.

| Thermal cycling test | CE7 | CE8 | E3 |
|---|---|---|---|
| Facing Material/Layer | HIPS | PET | PBT |
| Thermal cycling test | no change of surface texture | Surface texture deteriorates | no change of surface texture |

TABLE 5

Test of chemical resistance for Cyclopentane 95 (10 pbw per 100 pbw polyol) as PU rigid foam blowing agent.

| Tensile Strength [MPa] | CE9 | E4 |
|---|---|---|
| Facing Material/Layer | HIPS | PBT |
| initial | 24.0 | 37.3 |
| 14 days | 5.4 | 38.3 |
| 28 days | 2.9 | 37.7 |
| Difference [%] | −68 | ±0* |

*within the experimental error

TABLE 6

Test of chemical resistance for HCFO (1233zd(E); 20 pbw per 100 pbw polyol) as PU rigid foam blowing agent.

| Tensile Strenght [MPa] | CE10 | E5 |
|---|---|---|
| Facing Material/Layer | HIPS | PBT |
| initial | 24.0 | 37.3 |
| 14 days | 22.5 | 36.5 |
| 28 days | 21.2 | 35.9 |
| Difference [%] | −12 | −4 |

The results displayed in Tables 5 and 6 show that a layer made of PBT possesses a higher chemical resistance against usual blowing agents for rigid closed-celled PU foams like cyclopentane or trans-1-chloro-3,3,3-trifluoropropene than HIPS as evidenced by the clear decrease of the tensile strength of HIPS in contrast to the small or not existent deterioration of the tensile strength of PBT.

The invention claimed is:

1. A thermal insulation element, comprising:
   a closed-cell rigid polyurethane foam, which is at least partially covered by a layer system comprising at least one layer formed by a polybutylene terephthalate composition.

2. The thermal insulation element according to claim 1, wherein the polybutylene terephthalate composition comprises at least 30 wt. % polybutylene terephthalate, based on a total weight of the polybutylene terephthalate composition.

3. The thermal insulation element according to claim 1, wherein the polybutylene terephthalate composition comprises at least one additional polymer.

4. The thermal insulation element according to claim 1, wherein the polybutylene terephthalate composition comprises:
   50 to 95 wt % of polybutylene terephthalate as component A,
   5 to 50 wt % of at least one additional polymer as component B,
   0 to 30 wt % of mineral filler as component C, and
   0 to 20 wt % of further additives as component D,
   based on a total weight of the polybutylene terephthalate composition.

5. The thermal insulation element according to claim 1, wherein the polybutylene terephthalate composition comprises at least one additional polymer selected from thermoplastic polymers having a melting point below 220° C.

6. The thermal insulation element according to claim 1, wherein the polybutylene terephthalate composition comprises at least one additional polymer selected from the group consisting of a polyester based on aliphatic and/or aromatic dicarboxylic acids; a polyester based on aliphatic dihydroxy compounds; a thermoplastic elastomer; a copolymer of acrylic ester, styrene, and acrylonitrile; polylactic acid; polypropylene; polyethylene; and a mixture thereof.

7. The thermal insulation element according to claim 1, wherein the polybutylene terephthalate composition comprises at least one additional polymer selected from the group consisting of a polyester based on aliphatic and aromatic dicarboxylic acids and a polyester based on aliphatic dihydroxy compounds.

8. The thermal insulation element according to claim 1, wherein the at least one layer formed by the polybutylene terephthalate composition has a thickness of from 0.005 to 500 mm.

9. The thermal insulation element according to claim 1, wherein the layer system comprises at least one second layer selected from the group consisting of a metal layer, a paper layer, a coated paper layer, and a polymer layer.

10. The thermal insulation element according to claim 1, wherein the layer system comprises at least one second polymer layer, and wherein the layer system was prepared by coextrusion of the at least one layer formed by the polybutylene terephthalate composition and the at least one second polymer layer.

11. The thermal insulation element according to claim 1, wherein the layer system is directly attached to the closed-cell rigid polyurethane foam.

12. The thermal insulation element according to claim 1, wherein the closed-cell rigid polyurethane foam was prepared with at least one blowing agent selected from the group consisting of a non-halogenated hydrocarbon, a partially halogenated hydrocarbon, and water.

13. The thermal insulation element according to claim 1, wherein the closed-cell rigid polyurethane foam has a free rise density of at maximum 200 g/L.

14. A cooling device, comprising the thermal insulation element according to claim 1.

15. A process for producing the thermal insulation element according to claim 1, the process comprising:
   providing the layer system and preparing the closed-cell rigid polyurethane foam in situ by applying a polyurethane reaction mixture in direct contact to the layer system.

16. The cooling device according to claim 15, wherein the cooling device is selected from the group consisting of a refrigerator, a freezer, a heat storage system, a water heater, a battery system, an insulation panel for buildings, an insulation board for buildings, a truck, a trailer, a window frame, a door, a garage door, an insulated pipe, a mobile transport system, and an insulated transport box.

17. The thermal insulation element according to claim 1, wherein said a closed-cell rigid polyurethane foam used in the thermal insulation element has a free rise density of from 20 to 60 g/L.

\* \* \* \* \*